United States Patent
Stickel et al.

(12) 
(10) Patent No.: US 6,189,550 B1
(45) Date of Patent: Feb. 20, 2001

(54) PUMP-CONNECTOR

(75) Inventors: Ernst Stickel, Giengen; Johann Wilhelmstätter, Giengen/Hürben; Manfred Seessle, Dettingen, all of (DE)

(73) Assignee: BSH Bosch und Siemens Hausgeraete GmbH, Munich (DE)

( * ) Notice: Under 35 U.S.C. 154(b), the term of this patent shall be extended for 0 days.

(21) Appl. No.: 09/223,651

(22) Filed: Dec. 30, 1998

(30) Foreign Application Priority Data

Dec. 30, 1997 (DE) .............................................. 197 58 249

(51) Int. Cl.$^7$ ................................. B08B 3/00; F16L 21/00
(52) U.S. Cl. ...................... 134/174; 134/201; 285/235; 285/236; 285/49; 285/906
(58) Field of Search ................................. 285/235, 236, 285/224, 229, 299, 300, 301, 49, 906; 134/174, 201

(56) References Cited

U.S. PATENT DOCUMENTS

| | | | |
|---|---|---|---|
| 1,015,180 | * 1/1912 | Heitman | 285/226 |
| 3,680,896 | * 8/1972 | Cupit | 285/224 |
| 3,807,419 | * 4/1974 | Jenkins | 134/104.1 |
| 4,304,530 | * 12/1981 | Gens | 285/237 |
| 4,741,357 | * 5/1988 | Milocco | 137/387 |
| 5,010,920 | * 4/1991 | Tolf et al. | 134/57 D |
| 5,704,656 | * 1/1998 | Rowe | 285/236 |
| 5,947,135 | * 9/1999 | Sumida et al. | 134/95.3 |

FOREIGN PATENT DOCUMENTS

| | | | |
|---|---|---|---|
| 835239 | * 3/1952 | (DE) | 285/236 |
| 2301869 | * 7/1973 | (DE) | 285/236 |
| 627278 | * 8/1949 | (GB) | 285/235 |

* cited by examiner

*Primary Examiner*—Dave W. Arola
(74) *Attorney, Agent, or Firm*—Herbert L. Lerner; Laurence A. Greenberg; Werner H. Stemer

(57) ABSTRACT

The pump-connector has an elastic member that seals a connecting socket against a connecting piece that partly projects into the connecting socket. The elastic member is folded in between the connecting socket and the nozzle.

21 Claims, 1 Drawing Sheet

PUMP-CONNECTOR

BACKGROUND OF THE INVENTION

1. Field of the Invention

Figure 1:
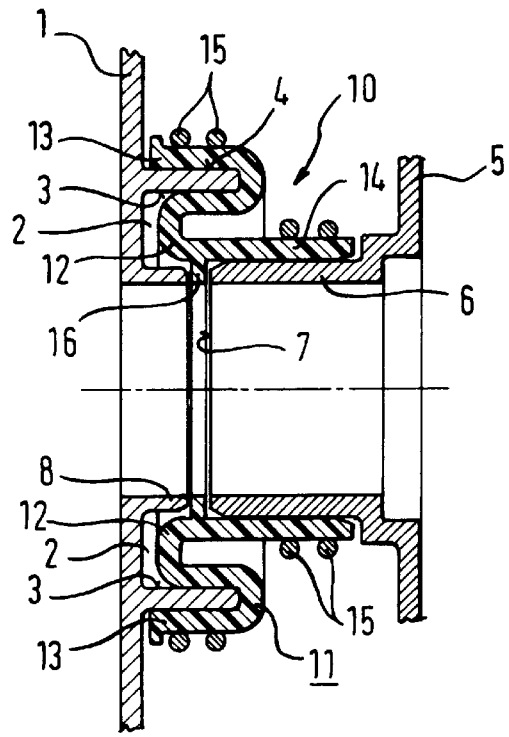

The invention relates to a pump-connector having elastic member between a pump connection and a further connection.

Devices of the type mentioned at the beginning are used, for example, for the liquid-conducting and tight connection between the suction pipe of a pump and an outlet connection piece of a container from which the liquid is to be pumped out. Such devices are normally hose sections which encase both connection pieces and are sealingly restrained on both connection pieces with clamps such as, for instance, hose clips.

These connections have the disadvantage that the vibrations and running noises of the pump are transmitted to the connected container. If the containers are parts of a household appliance for example, such as a dishwasher, the desired smooth running is considerably reduced as a result.

2. Summary of the Invention

It is accordingly an object of the invention to provide a pump hose connector, which overcomes the above-mentioned disadvantages of the heretofore-known devices and methods of this general type and in which transmission of the vibrations and running noises of the pump is avoided to the greatest possible extent.

With the foregoing and other objects in view there is provided, in accordance with the invention, a pump-connector, comprising:

a connecting socket;

a connection piece partly accommodated within the connecting socket;

an elastic member fluid-tightly sealing the connecting socket with the connection piece, the elastic member being folded between the connecting socket and the connection piece.

The elastic member according to the invention has a bellows-like configuration. It has been found in practice that transmission of the vibrations and running noises of the pump does not take place. With the elastic member, arranged according to the invention in a folded form between a connecting socket, which at least partly accommodates a connection piece, and the connection piece, a pump-connector of the type mentioned at the beginning in which transmission of the vibrations and running noises of the pump is avoided to the greatest possible extent is therefore provided.

In accordance with an added feature of the invention, the elastic member is folded with at least one bend. The at least one bend ensure the functions according to the invention.

In accordance with an additional feature of the invention, the connecting socket is formed with a stop ring and the connection piece has a socket-side end, the elastic member being formed with a collar projecting between the socket-side end of the connection piece and the stop ring of the connecting socket. This feature provides for additional tightness of the connection.

In accordance with another feature of the invention, the connecting socket has an outer collar formed with an outer surface and the elastic member is disposed on the outer surface of the outer collar and extends over the connection piece, and including clamp members restraining and sealing the elastic member against the outer surface of the outer collar and against the connection piece. This embodiment of the pump-connector according to the invention is very simple and inexpensive to produce but is somewhat complicated to assemble on account of the necessary clamping means.

In accordance with a further feature of the invention, the elastic member is formed with bearing surfaces bearing against the connecting socket and the connection piece, and including supporting rings disposed in the region of the bearing surfaces of the elastic member. This preferred embodiment of the device according to the invention is very simple and inexpensive to assemble, since no clamps and the like are required, but is somewhat more complicated to produce than the embodiment described above.

In accordance with again an added feature of the invention, the elastic member is formed with legs carrying the bearing surfaces, and the supporting rings are molded into the legs of the elastic member. This provides for a convenient prefabricated assembly group.

In accordance with again an additional feature of the invention, the elastic member has an outer dimension that is prestressed relative to an inner diameter of the connecting socket and an inner dimension that is prestressed relative to an outer diameter of the connection piece. Simple and easy assembly is assured with this feature. The entire pump-connector, therefore, without further retaining means or clamps, need only be pressed into the connecting socket and put onto the connection piece.

In accordance with again another feature of the invention, the supporting rings are made of a substantially non-elastic material, such as metal or a rigid plastic.

In accordance with again a further feature of the invention, the elastic member is made of a rubber material. This achieves the best damping results.

In accordance with yet a further feature of the invention, the elastic member is made of a rubber material, and the supporting rings are vulcanized into the elastic member. Again, this provides for a convenient and simple prefabricated assembly group.

In accordance with a concomitant feature of the invention, the connecting socket is formed on a collecting pan of a rinsing container of a dishwasher, and the pump is a circulating pump and/or a wastewater pump, and the connection piece is an inlet connection piece of the pump. The utilization of the combination in a household appliance is a preferred application of the pump-connector according to the invention.

Other features which are considered as characteristic for the invention are set forth in the appended claims.

Although the invention is illustrated and described herein as embodied in a pump-connector, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

SUMMARY OF THE INVENTION

Figure 2:
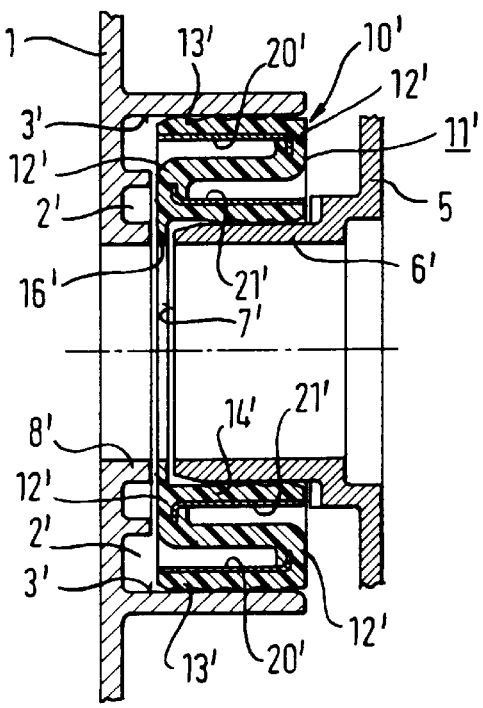

FIG. 1 is a sectional view taken through an exemplary pump-connector according to the invention; and FIG. 2 is a sectional view taken through a preferred embodiment of the pump-connector according to the invention.

DESCRIPTION OF THE PREFERRED EMBODIMENTS

The two embodiments described below make reference to the application of the invention in the context of dishwasher (not shown in any detail). Dishwashers are generally provided with a drain pan 1, designated as pump pot, below a treatment space that is designated the rinsing container. The liquid sprayed onto dishes and silverware in the rinsing container collects in the pump pot. From there, the liquid is delivered with a circulating pump 5 back to the spray arms in the rinsing container during a subprogram sequence that uses the liquid, or it is delivered by means of a wastewater pump to a discharge line leading into the local wastewater network at the end of the rinsing subprogram sequence. The drain pan 1 is equipped with inlet connections for both pumps. The connection of a circulating pump 5 to the drain pan 1 is shown below with different embodiments of the pump-connector 10, 10' according to the invention. It goes without saying that the pump-connector 10, 10' according to the invention is also used for the connection of the wastewater pump to the drain pan 1.

Referring now to the figures of the drawing in detail and first, particularly, to FIG. 1 thereof, there is seen a pump-connector 10 according to the invention connected between the drain pan 1 and the circulating pump 5. The connector has an elastic member which is designed as a sealing element 11 of essentially double-ring-shaped configuration and is arranged between a pump connection—a suction connection piece 6—and a further connection—the connecting socket 2—of the drain pan 1. The connecting socket 2 partly accommodates the suction connection piece 6. By means of a bend 12 or fold 12, the elastic member (the sealing element 11) is arranged in a folded form between the inner surface 3 of an outer collar of the connecting socket 2 and the suction connection piece 6. An outer collar 13 of the sealing element 11 is placed over an outer surface 4 of the outer collar of the connecting socket 2. The sealing element 11 extends with an inner extension 14 over the suction connection piece 6. The outer collar 13 of the sealing element 11 and the inner extension 14 of the sealing element 11 are in each case restrained in a sealing manner by clamp members. In the exemplary embodiment, the clamp members are hose clips 15 that seal the outer collar 13 and the inner extension 14 against the outer surface 4 of the outer collar of the connecting socket 2 and correspondingly against the suction connection piece 6. Furthermore, in order to achieve further reliability with respect to the tightness, the sealing element 11 has a collar 16 which projects between the socket-side end 7 of the suction connection piece 6 and a stop ring 8 of the connecting socket 2. The functionality of the integrally formed-on collar 16 is similar to that of an O-ring.

This first embodiment of the pump-connector 10 according to the invention is very simple and inexpensive to produce but is somewhat complicated to assemble on account of the clamps 15.

Referring now to FIG. 2, the preferred embodiment of the pump-connector 10' likewise has an elastic member between the drain pan 1 and the circulating pump 5. The elastic member is a sealing element 11' of essentially double-ring-shaped configuration and is arranged between a pump connection—a suction connection piece 6'—and a further connection—the connecting socket 2'—of the drain pan 1. The sealing element 11' bears on the suction connection piece 6' with a bearing surface 14' and against the inner surface 3' of an outer collar of the connecting socket 2' with a bearing surface 13'. The connecting socket 2' partly accommodates the suction connection piece 6'. By means of bends 12' or folds 12', the elastic member (the sealing element 11') is arranged in a folded form between the inner surface 3' of an outer collar of the connecting socket 2' and the suction connection piece 6'.

Unlike the embodiment shown in FIG. 1 of the pump-connector 10 according to the invention, in the case of the sealing element 11' of the preferred embodiment, shown in FIG. 2, of the pump-connector 10' according to the invention, supporting rings 20', 21' are arranged in the region of the bearing surface 13' at the connecting socket 2' and the bearing surface 14' at the suction connection piece 6'. In the exemplary embodiment shown, these supporting rings 20', 21' are made of a metal—steel—and, to obtain a prefabricated assembly group, are molded into the legs of the sealing element 11' which have the corresponding bearing surfaces 13', 14'. Alternatively, the supporting rings 20', 21' could also be made of a rigid plastic. In any case, they are always made of an essentially non-elastic material. For fastening, the sealing element 11' is prestressed with the external dimensions—with the diameter of the outer bearing surface 13'—relative to the inside diameter of the inner surface 3' of the outer collar of the connecting socket 2' and with the internal dimensions with the diameter of the inner bearing surface 14'—relative to the outside diameter of the suction connection piece 6'. The diameters of the outer bearing surface 13' and the inner bearing surface 14' of the elastic member 11' are slightly larger than the space receiving the elastic member 11', i.e., the inside diameter of the inner surface 3' and the outside diameter of the suction connection piece 6', respectively. The entire pump-connector 10', therefore, without further retaining means, need only be pressed into the connecting socket 2' and put onto the suction connection piece 6'. Furthermore, as in the exemplary embodiment shown in FIG. 1, in order to achieve further reliability with respect to the tightness, the sealing element 11' has a collar 16' which projects between the socket-side end 7' of the suction connection piece 6' and a stop ring 8' of the connecting socket 2'.

This preferred second embodiment of the pump-connector 10' according to the invention is very simple and inexpensive to assemble, since no clamps are required, but is somewhat more complicated to produce than the first embodiment described above.

A feature common to both embodiments of the pump-connector 10, 10' according to the invention is that the elastic member—the sealing means 11, 11'—are made of a rubber material, EPDM in both embodiments.

The result of this is that, for the preferred embodiment, shown in FIG. 2, of the pump-connector 10' according to the invention, the supporting rings 20', 21' are vulcanized into the elastic sealing element 11'.

With both embodiments of the pump-connector 10, 10' according to the invention which are shown and described, it has been found in practice that no transmission occurs of the vibrations and running noises of the pump 5.

Of course, the pump-connector 10, 10' according to the invention can only prevent transmission of vibrations and running noises of a pump at the connection point. The pump, provided it is also mounted in the housing of the appliance comprising the connected container, should of course also be mounted so as to provide appropriate noise insulation in order to avoid transmission of vibrations and running noises of the pump. Specifically, reference may be had to German Patent 33 04 236, where the pump is mounted at its center of gravity in such a way that it rests on or is suspended on soft rubber bearings.

The elastic member—the sealing element 11, 11'—disposed according to the invention, i.e., folded between the connecting socket 2, 2', which at least partly accommodates a suction connection piece 6, 6', and the suction connection piece 6, 6', provides for a pump-connector 10, 10' in which the transmission of the vibrations and running noises of the pump 5 is avoided to the greatest possible extent.

We claim:

1. A pump-connector, comprising:
    a connecting socket;
    a connection piece partly accommodated within said connecting socket;
    an elastic member fluid-tightly sealed against said connecting socket and said connection piece, said elastic member being folded between said connecting socket and said connection piece, said elastic member having bearing surfaces bearing against said connecting socket and said connection piece, said elastic member having legs carrying said bearing surfaces; and
    supporting rings molded into said legs and disposed at said bearing surfaces.

2. The pump-connector according to claim 1, wherein said elastic member is folded with at least one bend.

3. The pump-connector according to claim 1, wherein said connecting socket is formed with a stop ring and said connection piece has a socket-side end, said elastic member being formed with a collar projecting between said socket-side end of said connection piece and said stop ring of said connecting socket.

4. The pump-connector according to claim 1, wherein said connecting socket has an outer collar formed with an outer surface and said elastic member is disposed on said outer surface of said outer collar and extends over said connection piece, and including clamp members restraining and sealing said elastic member against said outer surface of said outer collar and against said connection piece.

5. The pump-connector according to claim 4, wherein said elastic member has an outer dimension that is prestressed relative to an inner diameter of said connecting socket and an inner dimension that is prestressed relative to an outer diameter of said connection piece.

6. The pump-connector according to claim 1, wherein said elastic member has an outer dimension that is prestressed relative to an inner diameter of said connecting socket and an inner dimension that is prestressed relative to an outer diameter of said connection piece.

7. The pump-connector according to claim 1, wherein said supporting rings are made of a substantially non-elastic material.

8. The pump-connector according to claim 7, wherein said supporting rings are metal rings.

9. The pump-connector according to claim 7, wherein said supporting rings are rigid plastic rings.

10. The pump-connector according to claim 1, wherein said elastic member is made of a rubber material.

11. A pump-connector, comprising:
    a connecting socket;
    a connection piece partly accommodated within said connecting socket;
    an elastic member fluid-tightly sealed against said connecting socket and said connection piece, said elastic member being folded between said connecting socket and said connection piece, said elastic member having bearing surfaces bearing against said connecting socket and said connection piece, said elastic member being made of a rubber material; and
    supporting rings disposed at said bearing surfaces and vulcanized into said elastic member.

12. The pump-connector according to claim 11, wherein said elastic member is folded with at least one bend.

13. The pump-connector according to claim 11, wherein said connecting socket is formed with a stop ring and said connection piece has a socket-side end, said elastic member being formed with a collar projecting between said socket-side end of said connection piece and said stop ring of said connecting socket.

14. The pump-connector according to claim 11, wherein said connecting socket has an outer collar formed with an outer surface and said elastic member is disposed on said outer surface of said outer collar and extends over said connection piece, and including clamp members restraining and sealing said elastic member against said outer surface of said outer collar and against said connection piece.

15. The pump-connector according to claim 14, wherein said elastic member has an outer dimension that is prestressed relative to an inner diameter of said connecting socket and an inner dimension that is prestressed relative to an outer diameter of said connection piece.

16. The pump-connector according to claim 11, wherein said elastic member has an outer dimension that is prestressed relative to an inner diameter of said connecting socket and an inner dimension that is prestressed relative to an outer diameter of said connection piece.

17. The pump-connector according to claim 11, wherein said supporting rings are made of a substantially non-elastic material.

18. The pump-connector according to claim 17, wherein said supporting rings are metal rings.

19. The pump-connector according to claim 17, wherein said supporting rings are rigid plastic rings.

20. The pump-connector according to claim 11, wherein said elastic member is made of a rubber material.

21. In a dishwasher having a circulating pump, a wastewater pump, and a rinsing container with a collecting pan, a pump connector to be connected to one of the circulating pump and the wastewater pump, the pump-connector, comprising:
    a connecting socket formed on the collecting pan;
    a connection piece partly accommodated within said connecting socket, said connection piece being an inlet connection piece of one of the circulating pump and the wastewater pump; and
    an elastic member fluid-tightly sealed against said connecting socket and said connection piece, said elastic member being folded between said connecting socket and said connection piece.

* * * * *